(12) United States Patent
Schmid et al.

(10) Patent No.: US 8,644,022 B2
(45) Date of Patent: Feb. 4, 2014

(54) INTERNAL DEVICE ARRANGEMENT FOR A PASSENGER CABIN

(75) Inventors: Frank Schmid, Poppenricht (DE); Marc Renz, Schwabach (DE); Norbert Knopp, Leinburg (DE); Jürgen Grabmann, Nürnberg (DE); Dietmar Völkle, Biberach (DE); Markus Klingseis, Biberach (DE); Wolf-Dieter Kuhnla, Kaisheim-Leitheim (DE)

(73) Assignee: Diehl Aerospace GmbH, Überlingen (DE)

( * ) Notice: Subject to any disclaimer, the term of this patent is extended or adjusted under 35 U.S.C. 154(b) by 258 days.

(21) Appl. No.: 13/162,080

(22) Filed: Jun. 16, 2011

(65) Prior Publication Data

US 2011/0310556 A1 Dec. 22, 2011

(30) Foreign Application Priority Data

Jun. 18, 2010 (DE) .......................... 10 2010 024 264

(51) Int. Cl.
*H05K 7/20* (2006.01)
(52) U.S. Cl.
USPC ............ 361/690; 361/704; 361/707; 362/373
(58) Field of Classification Search
None
See application file for complete search history.

(56) References Cited

U.S. PATENT DOCUMENTS

| | | | | |
|---|---|---|---|---|
| 5,597,233 A | * | 1/1997 | Lau ................................. | 362/294 |
| 5,664,872 A | * | 9/1997 | Spearman et al. ............... | 362/96 |
| 7,651,248 B2 | * | 1/2010 | Hua ............................... | 362/373 |
| 7,654,688 B2 | * | 2/2010 | Li et al. .......................... | 362/240 |
| 7,670,021 B2 | * | 3/2010 | Chou ............................. | 362/148 |
| 7,815,327 B2 | * | 10/2010 | Shamshoian .................... | 362/96 |
| 8,092,035 B2 | * | 1/2012 | Mandy et al. .................. | 362/147 |
| 8,197,098 B2 | * | 6/2012 | Cook .............................. | 362/294 |
| 8,240,871 B2 | * | 8/2012 | Chou .............................. | 362/148 |
| 2011/0080746 A1 | * | 4/2011 | Patti ............................... | 362/370 |
| 2012/0106138 A1 | * | 5/2012 | Mandy et al. .................. | 362/147 |

\* cited by examiner

*Primary Examiner* — Boris Chervinsky
(74) *Attorney, Agent, or Firm* — Scully, Scott, Murphy & Presser, P.C.

(57) ABSTRACT

An internal device arrangement for a passenger cabin, for example of an aircraft, is provided. The device has an internal device element which is selected from a group including wall paneling, window panel, side panel, ceiling paneling and luggage compartment. The device has an electrical apparatus fitted in or on the internal device element; and at least one line for supplying power to the electrical apparatus. Furthermore, a heat dissipation device in the form of an integral component part of the internal device element, the electrical apparatus and/or the at least one line is provided. Such a heat dissipation device makes it possible to dispense with an additional heat sink for temperature management and thus save installation space and weight.

11 Claims, 2 Drawing Sheets

INTERNAL DEVICE ARRANGEMENT FOR A PASSENGER CABIN

BACKGROUND

The present invention relates to an internal device arrangement, in particular for a passenger cabin for example in an aircraft.

It is known from the prior art that the electrically active component parts, such as lighting devices, for example, for the passenger cabin of an aircraft, a ship, a coach or the like are integrated in internal device elements, for example in the form of a supply unit (PSU: Passenger Service Unit or Passenger Seat Unit).

In order to represent a space-saving lighting device, light sources with small dimensions are preferably used. In order that the required luminous efficacy is achieved for illuminating the aircraft cabin, for example, such light sources, such as light-emitting diodes (LEDs) or mercury-free gas lamps, for example, have a high luminance. A certain proportion of the energy supplied or passed through is converted into thermal energy in virtually all types of electrical component parts. If the dimensions of the component part are small, this waste heat is concentrated over a small area. In general, the life of an electrical component part is reduced as the operating temperature increases. Therefore, it is necessary in particular in the case of miniaturized electrical component parts, such as LEDs for cabin lighting, for example, to dissipate the thermal energy which is incident in substantially punctiform fashion. Thus, firstly the temperature of the light source is kept low and secondly the surrounding component parts are protected from excessively high temperatures.

DE 10 2004 051 146 B4 discloses a lighting unit which has been inserted into the wall or ceiling panelling of a cabin in a passenger aircraft. One exemplary embodiment demonstrates how the waste heat produced at the light source can be dissipated by an additional heat sink in the form of a metal plate, which is kept spaced apart from the ceiling panelling by a spacer.

Although on the one hand such an additional heat sink is advantageous since the lightweight materials which are usually used for cabin panelling parts have poor thermal conductivity and are thus not suitable for cooling the electrical apparatus, on the other hand such a heat sink causes additional material consumption, an increased requirement for installation space and an increased weight.

SUMMARY

The invention is based on the object of providing an improved internal device arrangement with good temperature management.

The internal device arrangement, in particular for a passenger cabin, for example for an aircraft, a ship or a coach, comprises an internal device element which is selected from a group consisting of wall panelling, window panel, side panel, ceiling panelling and luggage compartment; an electrical apparatus which is fitted in or on the internal device element; and at least one line for supplying power to the electrical apparatus. According to the invention, this internal device arrangement is characterized by the fact that a heat dissipation device in the form of an integral component part of the internal device element, the electrical apparatus and/or the at least one line is provided.

By virtue of the advantageous integral design of a heat dissipation device with the internal device element, the electrical apparatus and/or the at least one line, it is possible to dispense with an additional heat sink for temperature management in the internal device arrangement according to the invention, which makes it possible to save on installation space and weight.

An "electrical apparatus" is preferably understood to mean an apparatus for connecting electrical power or for converting electrical energy into light, for example. For example, the electrical apparatus has at least one electrical component such as a transistor, a thyristor, a diode or a light-emitting diode (LED). It is also possible for a plurality of electrical components to be combined, for example on a printed circuit board, to form an electrical circuit or a structural unit.

The electrical apparatus of the internal device arrangement is, for example, a lighting apparatus such as a reading lamp, an optical display, a loudspeaker, an input apparatus, an actuator, a drive motor or the like.

An "internal device element" is preferably intended to mean a panelling part of a passenger cabin for example of an aircraft. The internal device element can advantageously be, at least in regions, a sandwich-like component part. Preferably, such a sandwich-like component part has a first covering layer and a second covering layer as well as a fill layer, with this fill layer being arranged substantially between the first and the second covering layer. An internal device element is in particular a wall, floor or ceiling panelling or a window, side or door panel.

A "heat dissipation device" is generally intended to dissipate the heat generated by the electrical apparatus during operation thereof away from the electrical apparatus in order to prevent said electrical apparatus from overheating.

In one embodiment, the internal device element has at least partially thermally conductive fibres or a thermally conductive fibre-reinforced material with high thermal conductivity in the region of the electrical apparatus. Preferably, thermally conductive fibres are woven together to form a thermally conductive textile. Preferably, the thermally conductive textile is applied to an internal device element and has high thermal conductivity.

Preferably, high thermal conductivity is understood to mean a thermal conductivity which is greater than 75 W/mk, preferably greater than 150 W/mK. Preferably, fibres with a high thermal conductivity consist of a material which has these properties. For example, fibres consisting of a metallic or a graphite-containing material can be used as the fibres with high thermal conductivity. For example, a material with high thermal conductivity has aluminium, copper, steel, graphite or magnesium as constituents.

In a further embodiment, an internal device element has, in the region of the electrical apparatus, at least partially a coating with high thermal conductivity. Preferably, such coatings are in the form of an electrically insulating coating. An electrically insulating coating with high thermal conductivity preferably has, as constituent, a silicone film with or without mechanical reinforcing fibres, a polymeric film, in particular consisting of polyimide, a phase changing material, a layer of polymers or gap fillers consisting of soft elastomers with or without mechanical reinforcement, and polymeric films with improved thermal conduction properties. Owing to the electrically insulating effect and good thermal conduction, an improved internal device arrangement is achieved.

Preferably, a coating with high thermal conductivity has an electrically non-insulating material as constituent. For example, such a material has aluminium, graphite or copper as a constituent. By virtue of an internal device element with a coating with high thermal conductivity, the waste heat which is produced in substantially punctiform fashion at the electrical apparatus is dissipated away from said apparatus.

Thus, the temperature of the electrical device is reduced and thus an improved internal device arrangement with cooling of the electrical apparatus is achieved.

In a further embodiment, an internal device element has, in particular in the region of the electrical apparatus, at least one throughflow channel, through which a coolant can flow. Preferably, this coolant is a gas or air flow, which has been discharged directly or indirectly from an air-conditioning unit. Preferably, this air-conditioning unit is provided for controlling the temperature of the passenger cabin for example in the aircraft. By virtue of a throughflow channel which is arranged in the internal device element in the region of the electrical apparatus, the temperature of this electrical apparatus is reduced and thus an improved internal device arrangement with cooling is provided.

In yet a further embodiment of the invention, the internal device element has a structured surface in the region of the electrical apparatus. Preferably, a structured surface is understood to mean a corrugated or rib-like formation of the surface of the internal device element. By virtue of such a structured surface, in particular the area for the convective emission of thermal energy is enlarged and thus the cooling effect of the electrical apparatus is improved.

A coolant, for example a cooling air flow, which has been discharged directly or indirectly from an air-conditioning unit of the passenger cabin, is then preferably caused to flow around the structured surface of the internal device element.

In one embodiment of the invention, the at least one line for supplying energy to the electrical apparatus is thermally conductively connected to the electrical apparatus. Preferably, this line is also thermally conductively connected to the internal device element. By virtue of the thermally conductive connection between the line and the electrical apparatus or the internal device element, the heat dissipation power of the internal device arrangement is improved. By virtue of the increased capacity to emit heat, the temperature of the electrical apparatus is reduced and thus an improved internal device arrangement with cooling is provided.

In a further embodiment, the electrical apparatus is arranged on a metallic component part, which is thermally conductively connected to the internal device element. Preferably, this metallic component part can be understood to mean a fitting or hinge component part, in particular of a luggage compartment, a cabin door, a reinforcing rib or a fastening element. Such a metallic component part can be used to enlarge the surface for convective heat emission from the electrical apparatus. In this way, the temperature of the electrical apparatus can be reduced and thus an internal device arrangement with good temperature management can be provided.

In yet a further embodiment of the invention, the electrical apparatus is thermally conductively connected to the internal device element in order to implement the dissipation of heat away from the electrical apparatus via the internal device element.

A thermally conductive connection is preferably understood to mean a connection which can conduct thermal flows. Preferably, the waste heat from the electrical apparatus is conducted to an internal device element or to a further component part by means of such a thermally conductive connection. The waste heat from the electrical apparatus is in particular transmitted from a housing or from a cover of the electrical apparatus preferably onto the internal device element or onto thermally conductive devices.

All of the abovementioned embodiments of the invention can be combined with one another as desired singly or multiply in order to provide further preferred embodiments of an internal device arrangement with good temperature management.

BRIEF DESCRIPTION OF THE DRAWINGS

The above and further features, advantages and possible applications of the invention are clarified by the description below relating to preferred, non-restrictive exemplary embodiments with reference to the attached drawings, in which.

DETAILED DESCRIPTION OF EXEMPLARY EMBODIMENTS

In the text which follows, the invention will be explained by way of example with reference to an internal device arrangement of a passenger cabin of an aircraft and with reference to a light-emitting element as the electrical apparatus to be cooled. It is of course also possible for the concept according to the invention to be applied to other applications without any problems.

Figure 1:
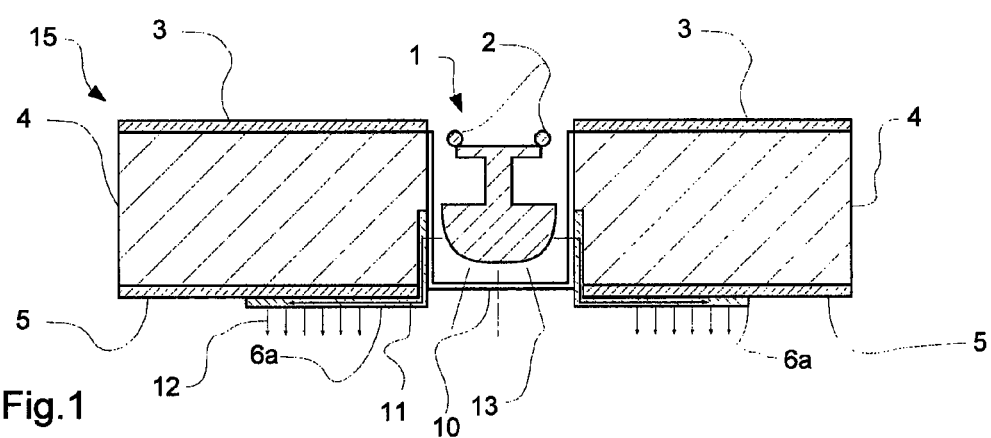
FIG. 1 shows a schematic sectional view of an internal device arrangement in accordance with a first exemplary embodiment with a light-emitting element, which is cooled by means of thermally conductive fibres.

FIG. 1 shows an internal device arrangement with an internal device element 15 in the form of a sealing panel or a luggage compartment panel, into which a light-emitting means such as a reading lamp 1, for example, has been inserted.

The in this case sandwich-like internal device element 15 has a first and a second covering layer 3, 5 and an intermediate layer 4. The light-emitting element 1 has been inserted into a cutout in this sandwich panel 15 and is supplied with electrical energy via lines 2. The light-emitting element 1 is covered on its side facing the passenger (at the bottom in FIG. 1) by a transparent lighting screen 10.

As illustrated in FIG. 1, the internal device element 15, which can be in the form of a sandwich panel, is provided with thermally conductive fibres 6a with high thermal conductivity or coated in the region of the light-emitting element 1.

Firstly, the light-emitting element 1 emits light beams 13 and secondly emits thermal energy. The thermal energy emitted by the light-emitting element 1 is conducted away at least partially in the form of a thermal flow 11 by the thermally conductive fibres 6a and emitted thereby to the surrounding environment. By virtue of the dissipation of the thermal energy, the temperature of the light-emitting element 1 and the internal device element 15 is kept low.

A second exemplary embodiment of an internal device arrangement will now be explained with reference to FIG. 2. In this case, the same components are characterized by the same reference numerals as in the first exemplary embodiment in FIG. 1.

Figure 2:
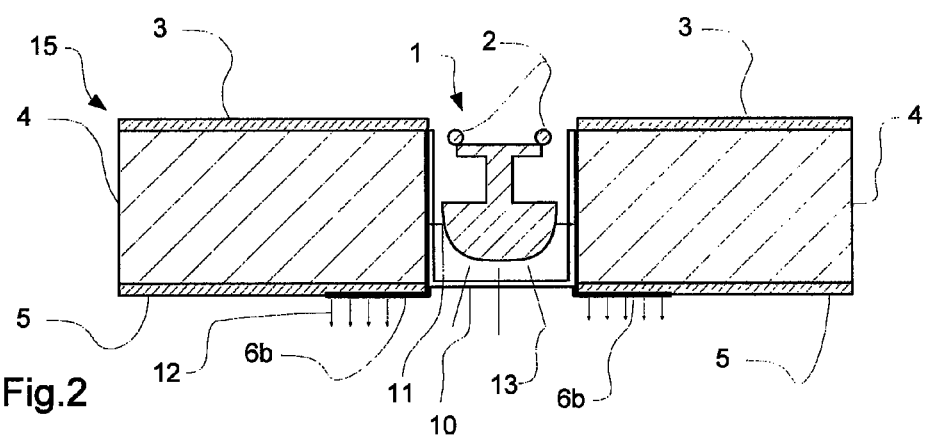
FIG. 2 shows a schematic sectional view of an internal device arrangement in accordance with a second exemplary embodiment with a light-emitting element, which is cooled by means of a thermally conductive coating.

As a deviation from the exemplary embodiment shown in FIG. 1, in the internal device arrangement shown in FIG. 2 the thermal flow 11 from the light-emitting element 1 is not dissipated by thermally conductive fibres 6a, but by a thermally conductive coating 6b.

This thermally conductive coating is in the form of a thermally conductive varnish, for example. Thermally conductive coatings 6b are particularly space-saving and weight-saving and can be applied to virtually all substrates.

The remaining components of this internal device arrangement correspond to those in the first exemplary embodiment above, for which reason the corresponding explanations have not been repeated.

A third exemplary embodiment of an internal device arrangement will now be explained with reference to FIG. 3. In this case, the same components have been characterized by the same reference numerals as in the above exemplary embodiments.

Figure 3:
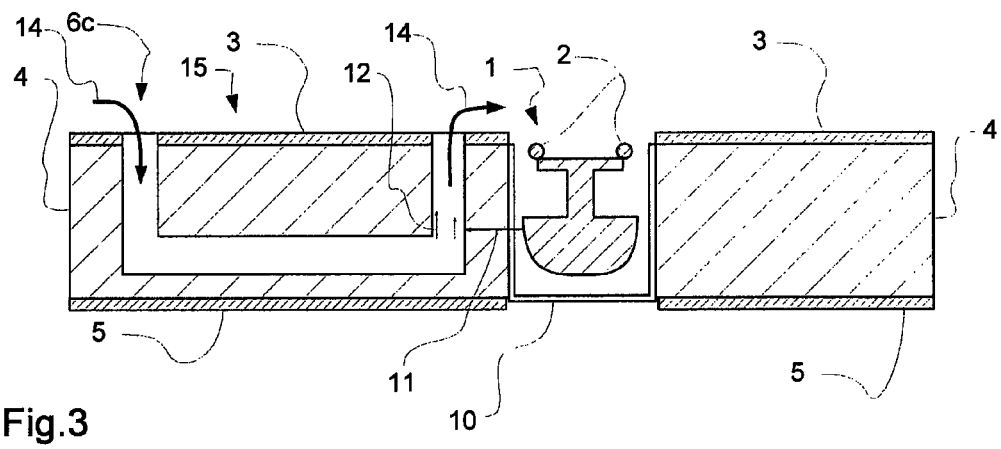
FIG. 3 shows a schematic sectional view of an internal device arrangement in accordance with a third exemplary embodiment with a light-emitting element, which is cooled by means of a heat-dissipating throughflow channel in the internal device element.

In the internal device arrangement shown in FIG. 3, a heat-dissipating throughflow channel 6c is introduced into the internal device element 15. The throughflow channel 6c is realized by virtue of cutouts in the internal device element 15. The throughflow channel 6c can also be understood to mean an intermediate layer 4 which is porous at least in regions and through which a coolant flow can flow.

A coolant 14 is caused to flow through this heat-dissipating throughflow channel 6c. This coolant 14 is branched off as cooling air away from the air-conditioning unit (not illustrated), which is intended in particular for the passenger cabin air-conditioning system. The thermal flow 11 emitted by the light-emitting element 1 is absorbed by the coolant 14 flowing through the throughflow channel 6c and at least partially dissipated thereby. By virtue of the heat 12 dissipated by the coolant 14, the temperature of the electrical apparatus 1 is reduced and thus an improved internal device arrangement with cooling is provided.

In order to achieve heat dissipation from the light-emitting element 1 which is as effective as possible via the coolant 14 in the throughflow channel 6c in the sandwich panel 15, it is advantageous if the light-emitting element 1 has a good thermally conductive connection with respect to the panel 15.

The remaining components of this internal device arrangement correspond to those in the first exemplary embodiment above, for which reason the corresponding explanations have not been repeated.

Figure 4:
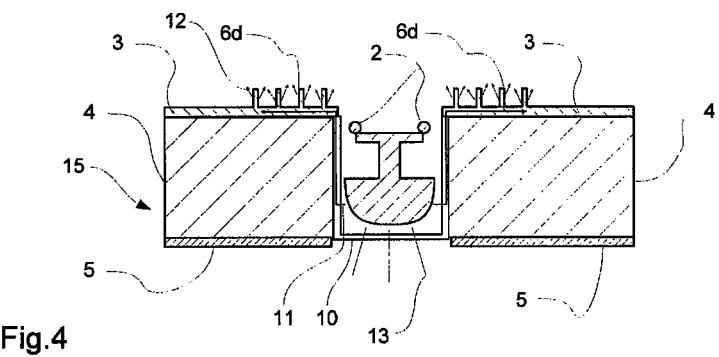
FIG. 4 shows a schematic sectional view of an internal device arrangement in accordance with a fourth exemplary embodiment with a light-emitting element, which is cooled by means of cooling ribs on the internal device element.

A fourth exemplary embodiment of an internal device arrangement will now be explained with reference to FIG. 4. In this case, the same components have been characterized by the same reference numerals as in the above exemplary embodiments.

In this exemplary embodiment, the sandwich panel 15 is formed with cooling ribs 6d (in general a corrugated or rib-like structure) on its side facing the supply channel. The cooling ribs 6d are arranged on one of the two covering layers 3, 5; it is also possible for cooling ribs 6d to be arranged on the first and second covering layers 3, 5. In order to improve the thermal conduction, in addition a thermally conductive coating 6b or thermally conductive fibres 6a can be provided, as is illustrated in FIG. 1 and FIG. 2.

The heat 12 dissipated away from the light-emitting element 1 is emitted to the surrounding environment by the cooling ribs 6d of the internal device element 15. Preferably, the cooling ribs 6d are subject to a coolant, for example a cooling air flow produced directly or indirectly by the air-conditioning unit of the passenger cabin, in order to increase the cooling effect.

The remaining components of this internal device arrangement correspond to those in the first exemplary embodiment above, for which reason the corresponding explanations have not been repeated.

A fifth exemplary embodiment of an internal device arrangement will now be explained with reference to FIG. 5. In this case, the same components have been characterized by the same reference numerals as in the exemplary embodiments above.

Figure 5:
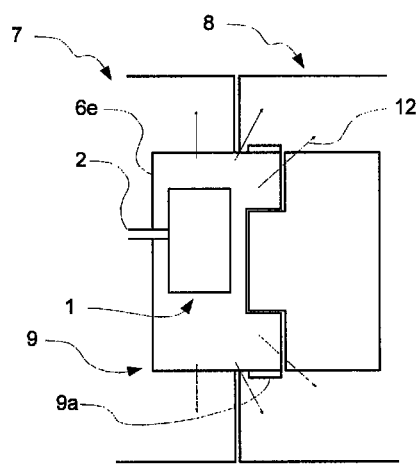
FIG. 5 shows a schematic sectional view of an internal device arrangement in accordance with a fifth exemplary embodiment with a light-emitting element, which has been applied to a metallic section of a hinge and is cooled thereby.

In the internal device arrangement illustrated in FIG. 5, the light-emitting element 15 is applied to a metallic component part, in particular to a fitting part, such as a hinge, for example, for cooling purposes. In this case, the hinge 9 connects, by means of a hinge pin 9a, for example a section of the interior panelling 7 to a section of the luggage compartment 8. By virtue of the good thermal conductivity of the hinge 9, the thermal flow 11 passes from the light-emitting element 1 to said hinge, and the heat 12 thus dissipated is emitted to the surrounding environment.

In particular in the case of electrical apparatuses 1 operated in the intermittent mode, the application of said electrical apparatuses to a metallic component part provides the advantage that said metallic component part first absorbs the thermal flow 11 and at least partially emits the stored heat to the surrounding environment in the time in which the electrical apparatus 1 is not operated.

The remaining components of this internal device arrangement correspond to those in the first exemplary embodiment above, for which reason the corresponding explanations have not been repeated.

A sixth exemplary embodiment of an internal device arrangement will now be explained with reference to FIG. 6. In this case, the same components have been characterized by the same reference numerals as in the exemplary embodiments above.

Figure 6:
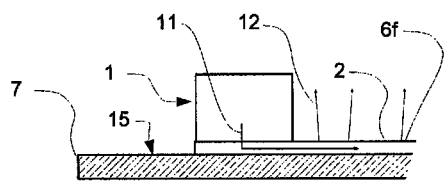
FIG. 6 shows a schematic sectional view of an internal device arrangement in accordance with a sixth exemplary embodiment with a light-emitting element, which is cooled via the power supply line.

FIG. 6 illustrates a light-emitting element 1, which has been applied directly to a section of the interior panelling 7. In this case, the electrical incoming or outgoing line 6f is configured in such a way that it can dissipate a thermal flow 11 from the light-emitting element 1 in order to emit the heat 12 thus dissipated to the surrounding environment.

In this case, the thermally conductive incoming or outgoing line 6f is in contact with in particular the electrical components of the apparatus 1 and is therefore particularly suitable for dissipating the heat generated therein. By virtue of dissipation of the heat by the line 6f, improved cooling of the light-emitting element 1 is thus achieved.

LIST OF REFERENCE NUMERALS

| | |
|---|---|
| 1. | Electrical apparatus/light-emitting element |
| 2. | Power supply line |
| 3. | First covering layer |
| 4. | Intermediate layer |
| 5. | Second covering layer |

| | |
|---|---|
| 6. | Heat dissipation devices |
| | a. thermally conductive fibres |
| | b. thermally conductive coating |
| | c. throughflow channel |
| | d. cooling structure |
| | e. hinge fittings |
| | f. heat-dissipating line |
| 7. | Section of interior panelling |
| 8. | Section of luggage compartment |
| 9. | Hinge pin |
| 10. | Lighting cover |
| 11. | Thermal flow |
| 12. | Emitted heat |
| 13. | Light beams |
| 14. | Coolant |
| 15 | Sandwich panel |

The invention claimed is:

1. An internal device arrangement for an aircraft passenger cabin, comprising:
 a cabin wall panel of the aircraft passenger cabin;
 an electrical apparatus integral with the cabin wall panel;
 at least one line for supplying power to the electrical apparatus; and
 a heat dissipation device integral with the cabin wall panel, the heat dissipation device comprising at least one of a thermally conductive coating and a thermally conductive textile, the thermally conductive textile being formed from thermally conductive fibers, the heat dissipation device having a thermal conductivity of 75 W/mK to 150 W/mK.

2. The internal device arrangement according to claim 1, wherein the heat dissipation device is disposed in the region of the electrical apparatus.

3. The internal device arrangement as claimed in claim 1, wherein the heat dissipation device further comprises at least one heat-dissipating throughflow channel, through which a coolant can flow.

4. The internal device arrangement according to claim 3, wherein the coolant comprises cooling air, which can be discharged directly or indirectly from an air-conditioning unit.

5. The internal device arrangement according to claim 1, wherein the heat dissipation device further comprises a corrugated or rib-like structure in the region of the electrical apparatus.

6. The internal device arrangement according to claim 5, wherein the corrugated or rib-like structure is subjected to a coolant which can be discharged directly or indirectly from an air-conditioning unit.

7. The internal device arrangement according to claim 1, wherein the at least one line is thermally conductively connected to the electrical apparatus.

8. The internal device arrangement according to claim 1, wherein the electrical apparatus is arranged on a metallic component part, which is thermally conductively connected to the cabin wall panel, with said metallic component part being a fitting or hinge component part of the cabin wall panel.

9. The internal device arrangement according to claim 1, wherein the electrical apparatus is thermally conductively connected to the cabin wall panel.

10. The internal device arrangement as claimed in claim 1, wherein said thermally conductive coating is a film-like or varnish-like coating with high thermal conductivity.

11. The internal device arrangement according to claim 6, wherein said coolant comprises a cooling air.

* * * * *